(12) United States Patent
Jaiswal et al.

(10) Patent No.: US 8,219,397 B2
(45) Date of Patent: Jul. 10, 2012

(54) DATA PROCESSING SYSTEM FOR AUTONOMOUSLY BUILDING SPEECH IDENTIFICATION AND TAGGING DATA

(75) Inventors: Peeyush Jaiswal, Boca Raton, FL (US); Vikram S. Khatri, Durham, NC (US); Naveen Narayan, Flower Mound, TX (US); Burt Vialpando, Irving, TX (US)

(73) Assignee: Nuance Communications, Inc., Burlington, MA (US)

( * ) Notice: Subject to any disclaimer, the term of this patent is extended or adjusted under 35 U.S.C. 154(b) by 1057 days.

(21) Appl. No.: 12/136,342

(22) Filed: Jun. 10, 2008

(65) Prior Publication Data
US 2009/0306979 A1    Dec. 10, 2009

(51) Int. Cl.
*G10L 15/00* (2006.01)
*G10L 15/26* (2006.01)
*G10L 17/00* (2006.01)
*G06F 17/20* (2006.01)

(52) U.S. Cl. ............. 704/235; 704/231; 704/246; 704/8
(58) Field of Classification Search ........................ None
See application file for complete search history.

(56) References Cited

U.S. PATENT DOCUMENTS

| | | | |
|---|---|---|---|
| 4,641,264 A | 2/1987 | Nitta et al. | |
| 4,994,966 A | 2/1991 | Hutchins | |
| 5,077,668 A | 12/1991 | Doi | |
| 5,297,027 A | 3/1994 | Morimoto et al. | |
| 5,819,260 A | 10/1998 | Lu et al. | |
| 6,336,093 B2 * | 1/2002 | Fasciano | 704/278 |
| 6,418,431 B1 * | 7/2002 | Mahajan et al. | 1/1 |
| 6,638,217 B1 * | 10/2003 | Liberman | 600/300 |
| 6,665,644 B1 * | 12/2003 | Kanevsky et al. | 704/275 |
| 6,996,526 B2 * | 2/2006 | Basson et al. | 704/231 |
| 7,865,354 B2 * | 1/2011 | Chitrapura et al. | 704/4 |
| 2002/0135618 A1 * | 9/2002 | Maes et al. | 345/767 |
| 2003/0088397 A1 * | 5/2003 | Karas et al. | 704/1 |
| 2005/0065777 A1 * | 3/2005 | Dolan et al. | 704/10 |
| 2006/0122834 A1 * | 6/2006 | Bennett | 704/256 |

* cited by examiner

*Primary Examiner* — Talivaldis Ivars Smits
*Assistant Examiner* — Jesse Pullias
(74) *Attorney, Agent, or Firm* — Wolf, Greenfield & Sacks, P.C.

(57) ABSTRACT

A method, system, and computer program product for autonomously transcribing and building tagging data of a conversation. A corpus processing agent monitors a conversation and utilizes a speech recognition agent to identify the spoken languages, speakers, and emotional patterns of speakers of the conversation. While monitoring the conversation, the corpus processing agent determines emotional patterns by monitoring voice modulation of the speakers and evaluating the context of the conversation. When the conversation is complete, the corpus processing agent determines synonyms and paraphrases of spoken words and phrases of the conversation taking into consideration any localized dialect of the speakers. Additionally, metadata of the conversation is created and stored in a link database, for comparison with other processed conversations. A corpus, a transcription of the conversation containing metadata links, is then created. The corpus processing agent also determines the frequency of spoken keywords and phrases and compiles a popularity index.

18 Claims, 3 Drawing Sheets

DATA PROCESSING SYSTEM FOR AUTONOMOUSLY BUILDING SPEECH IDENTIFICATION AND TAGGING DATA

BACKGROUND OF THE INVENTION

1. Technical Field

The present invention relates in general to computer based speech-to-text logic. Still more particularly, the present invention relates to using an autonomic speech and corpus processing agent to build identification and tagging data of a conversation.

2. Description of the Related Art

Current computer logic allows speech to be autonomously converted into text. However, components of speech such as emotions and voice inflections are often lost in the conversion. In many situations, this lost supporting information may cause a speech capture to text conversion to convey an incomplete meaning of a conversation.

SUMMARY OF THE INVENTION

A method, system, and computer program product for autonomously transcribing and building tagging data of a conversation. A corpus processing agent monitors a conversation and utilizes a speech recognition agent to identify the spoken languages, speakers, and emotional patterns of speakers of the conversation. While monitoring the conversation, the corpus processing agent determines emotional patterns by monitoring voice modulation of the speakers and evaluating the context of the conversation. When the conversation is complete, the corpus processing agent determines synonyms and paraphrases of spoken words and phrases of the conversation taking into consideration any localized dialect of the speakers. Additionally, metadata of the conversation is created and stored in a link database, for comparison with other processed conversations. A corpus, a transcription of the conversation containing metadata links, is then created. The corpus processing agent also determines the frequency of spoken keywords and phrases and compiles a popularity index.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

The illustrative embodiments provide a method, system, and computer program product for autonomously building speech identification and tagging data of a conversation via a corpus processing agent, in accordance with one embodiment of the invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
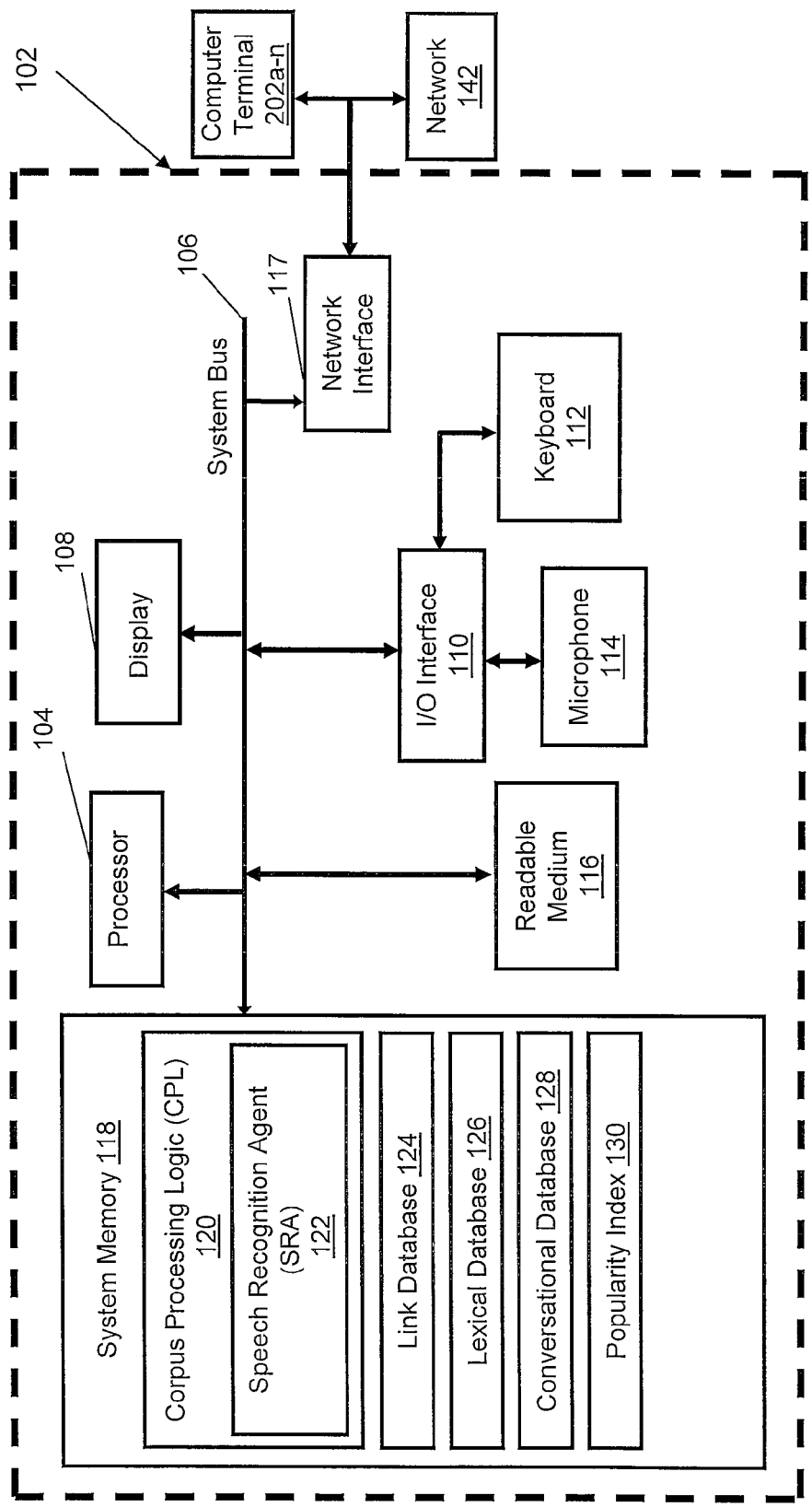
FIG. 1 is a block diagram of a corpus processing agent in which the present invention may be implemented.

With reference now to FIG. 1, there is depicted a block diagram of an exemplary corpus processing agent (CPA) 102 in which the present invention may be implemented. CPA 102 includes a processor 104 that is coupled to a system bus 106. A network interface 117, connected to system bus 106, enables CPA 102 to connect to computer terminals 202a-n and network 142 via wired or wireless technology. Input/Output (I/O) Interface 110, also connected to system bus 106, permits user interaction with CPA 102, such as data and/or audio entry via keyboard 112 and microphone 114, respectively. Display 108, coupled to system bus 106, allows for presentation of a general user interface (including text and graphics) for use by a user of CPA 102. System bus 106 also affords communication with a readable medium 116 (e.g., Compact Disk-Read Only Memory (CD-ROM), flash drive memory, etc).

CPA 102 also comprises system memory 118, which is connected to system bus 106. System memory 118 of CPA 102 includes corpus processing logic (CPL) 120. CPL 120 includes code for implementing the processes described in FIG. 2-3. CPL 120 also includes a speech recognition agent 122 for identifying and transcribing spoken languages and human emotions identified in a conversation. In one embodiment, CPA 102 is able to utilize CPL 120 to build a corpus of a conversation, as described in greater detail below in FIG. 2-3.

As shown, system memory 118 also comprises a link database 124, lexical database 126, conversation database 128, and popularity index 130. Link database 124 contains metadata tags of corpuses analyzed by CPA 102. Lexical database 126 is an electronic reference dictionary utilized by CPA 102 to substitute correct spellings for incorrectly spelled words of a corpus. Conversational database 128 is a paraphrase reference database which enables CPL 120 to substitute or build paraphrases for portions of a corpus. Popularity index 130 is a database of keywords and phrases of corpuses analyzed by CPA 102.

As illustrated and described herein, CPA 102 may be a computer system of server having the required hardware components and programmed with CPL 120, executing on the processor to provide the functionality of the invention. However, CPA 102 may also be a speech-to-text device that is specifically designed to include the functionality of CPL 120, as described herein. The hardware elements depicted in CPA 102 are not intended to be exhaustive, but rather are representative to highlight essential components required by and/or utilized to implement the present invention. For instance, CPA 102 may include alternate memory storage devices such as magnetic cassettes, Digital Versatile Disks (DVDs), Bernoulli cartridges, and the like. These and other variations are intended to be within the spirit and scope of the present invention.

Figure 2:
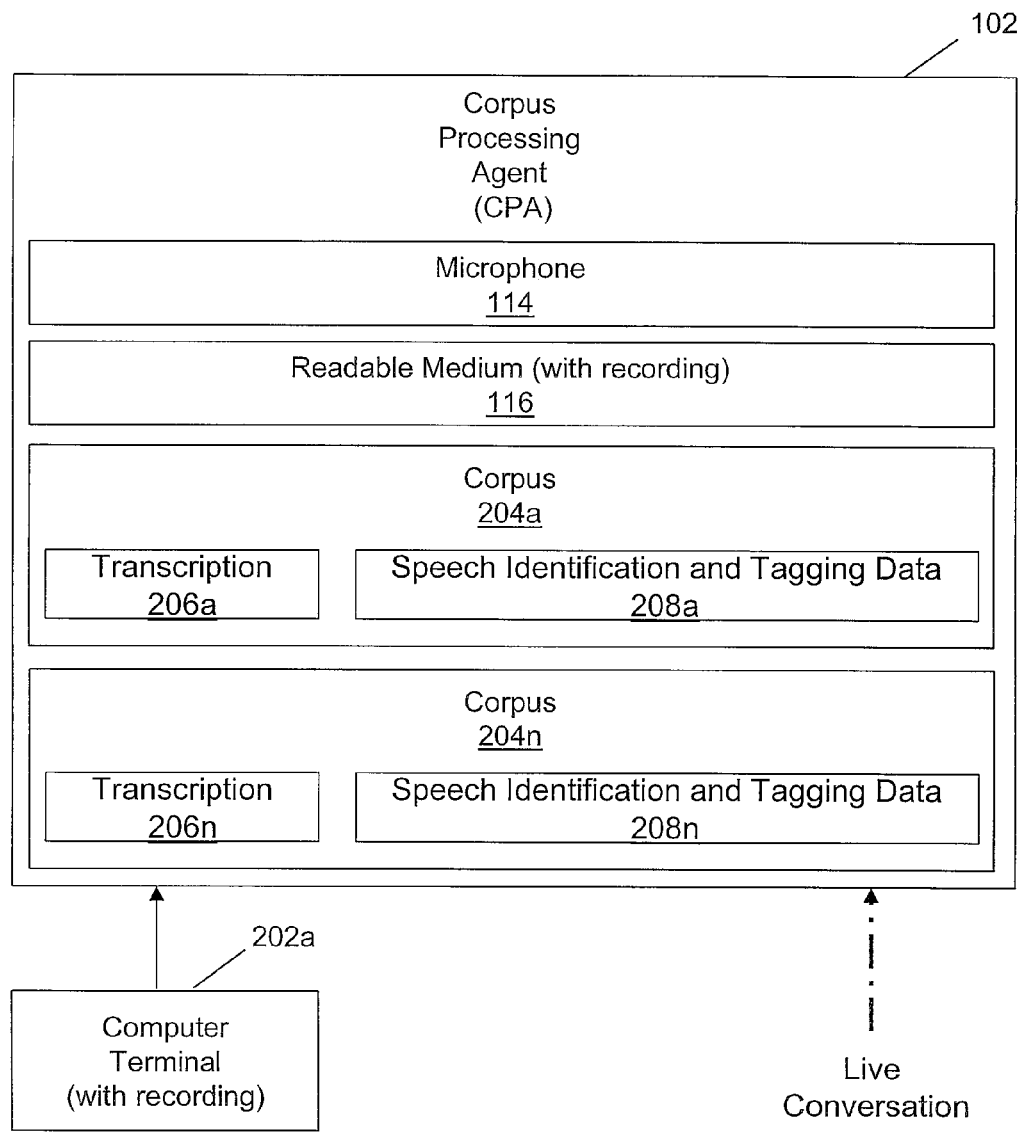
FIG. 2. is a block diagram of an exemplary system for implementing a corpus processing agent to build a corpus of a conversation.

With reference now to FIG. 2, there is illustrated an exemplary system for implementing a corpus processing agent (CPA) to build a corpus of a conversation. The illustrative embodiment is described from the perspective of the CPA building Corpus 204*a-n* from a conversation between multiple parties; However, the described features and functionality of CPA are fully applicable to a speech that involves a single speaker. CPA 102 monitors a conversation and builds Corpus 204*a-n* of the conversation. Corpus 204*a-n* contains an electronic Transcription 206*a-n* of the conversation and additionally contains Speech Identification and Tagging Data 208*a-n* of both the speakers and the content of Transcription 206*a-n*. CPA 102 contains logic (e.g., CPL 120) that autonomously monitors the conversation and creates Corpus 204*a-n*. The conversation may be a previously recorded conversation or a live conversation monitored in real time by a microphone (e.g., microphone 114). In an alternate embodiment, the conversation may be a digital recording stored on a readable medium (e.g., readable medium 116), or a digital recording transferred to CPA 102 by a Computer Terminal 202*a-n* through a network connection (not shown).

As a conversation is being analyzed, CPA 102 monitors language spoken by the speakers of the conversation to build Speech Identification and Tagging Data 208*a-n*. CPA 102 contains a speech recognition agent (SRA 122, FIG. 1) for identifying languages spoken by the speakers, emotional patterns of the speakers, and the identities of the speakers themselves. To identify a spoken language, CPA 102 establishes a relationship between accents and spoken words or phrases. This information is then compared against historical language index data of a language identification index (not pictured). To identify a speaker, CPA 102 identifies a sound signature from several voice segments of words spoken by a speaker. The tone is processed by logic of CPA 102 (e.g., CPL 120, FIG. 1), and the voice segments are connected to an identified tone of indexed historical voice data. To determine emotional patterns of the speakers, a logic of CPA 102 (e.g., CPL 120, FIG. 1) identifies emotional stress on a spoken portion of a conversation. The logic may then build prosodic patterns of spoken phrases by analyzing conversational stress levels (e.g., pitch variation and rate). Emotions in a speech can be detected using pattern catching algorithms through variations in pitch and tone and qualifying the pattern(s) against a historical database of known emotional patterns correlated with words and synonyms and attributing measurable parameters. Each detected pattern may then be scored and compared against historical conversational data. The patterns may then be correlated to emotions suitable for metadata tagging between different Corpuses 204*a-n* of communications.

A popularity index (e.g., popularity index 130, FIG. 1) may be created or further populated while a conversation is being analyzed by CPA 102. The popularity index contains an index of spoken words and phrases by speakers of a conversation, and the frequency for the number of times a particular word or phrase is spoken. Additionally, CPA 102 may build a list of synonyms for words and phrases spoken by a speaker in the conversation. The synonyms may be used to account for word choice, colloquialisms, or regional dialect of speakers in the conversation. A logic of CPA 102 (e.g., CPL 120, FIG. 1) may contrast data of the popularity index and the list of synonyms information against data of a lexical database (e.g., lexical database 126 of FIG. 1) and a conversational database (conversational database 128 of FIG. 1). This information may be used by CPA 102 to perform a word substitution of words and phrases of Corpus 204*a-n* to improve the meaning and comprehension. In an alternate embodiment, the list of synonyms may be incorporated into the popularity index.

Corpus 204*a-n* may be further enhanced with metadata tags to populate a link database (e.g. link database 124). A metadata tag may contain conversational information about speakers or content of a topic of a Corpus 204*a-n*. A metadata tag may further contain link data to associate similar patterns of content of a Corpus 204*a* to Corpuses 204*b-n* of other conversations (e.g., topics, speakers, spoken phrases, emotional patterns). This enables a user of CPA 102 to quickly reference related information of Corpus 204*a-n* to other related corpuses. Additionally, a metadata tag may contain a paraphrase of a portion of Corpus 204*a-n*. In an alternate embodiment, CPA 102 may also contain a search engine optimized keyword list for publishing content of Corpus 204*a-n* for a user of CPA 102.

Figure 3:
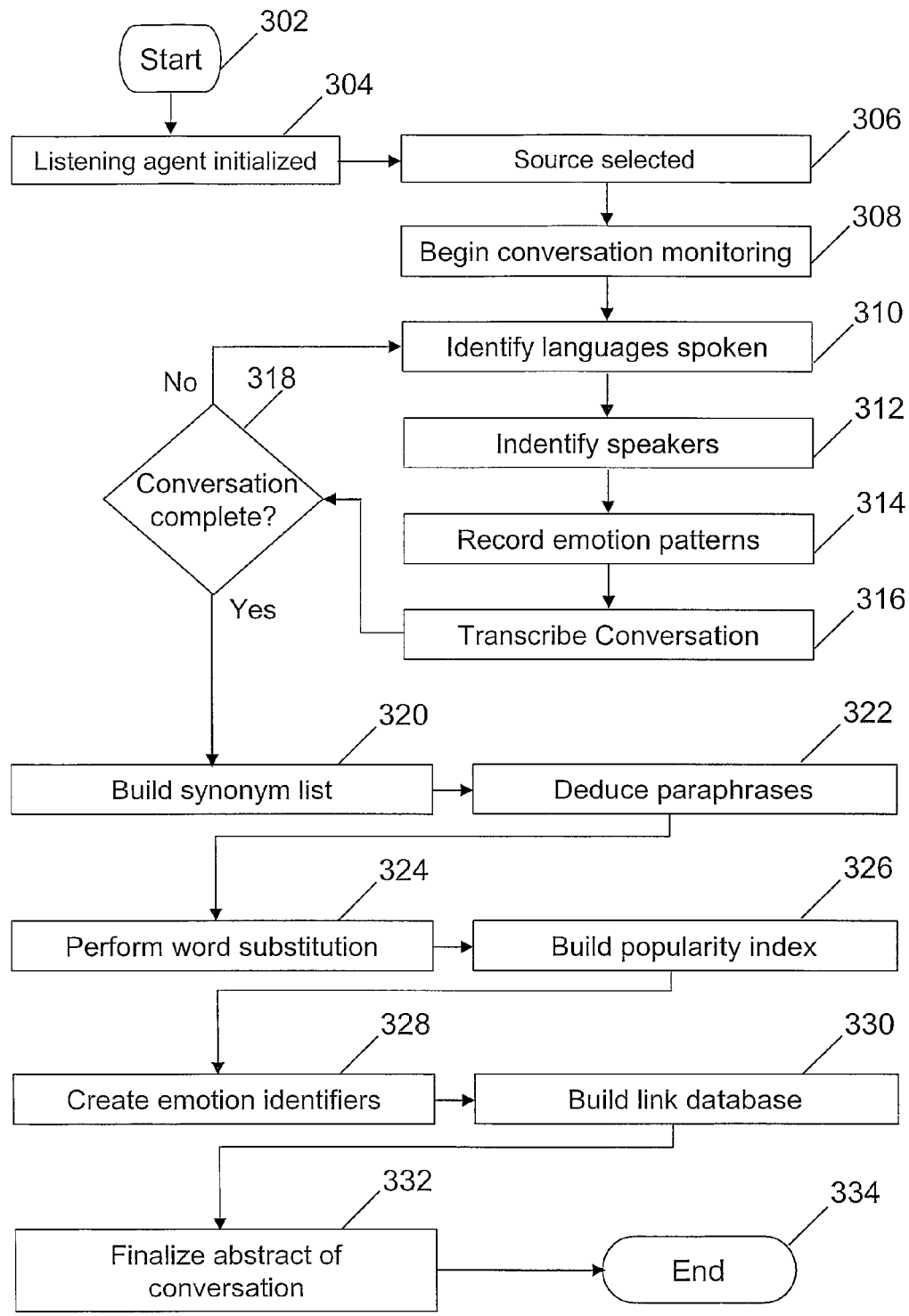
FIG. 3. is a high-level logical flowchart of an exemplary method for using a corpus processing agent to build a corpus of a conversation.

With reference now to FIG. 3, a high-level logical flowchart of an exemplary method for using a corpus processing agent to build a corpus of a conversation is presented. After initiator block 302, the corpus processing agent is initialized (block 304). The user then selects a communication source (e.g., a previously recorded conversation, or a live conversation) for processing by the corpus processing agent (block 306). After selecting the communication source, the corpus processing agent will begin monitoring the conversation (block 308).

The corpus processing agent monitors the conversation to identify the languages spoken by the speakers (block 310). The corpus processing agent will also identify all speakers of the conversation (block 312). Additionally, emotion patterns of the speakers are analyzed and recorded (block 314) as the conversation is being transcribed (block 316). While the conversation is taking place, the corpus processing agent continually performs the actions of block 310, block 312, block 314, and block 316. This loop repeats in an iterative manner until the conversation is complete (block 318). While the actions performed in of block 310, block 312, block 314, and block 316 are shown sequentially, these actions may be performed concurrently and continuously for as long as the conversation is taking place.

Once the conversation is complete, the corpus processing logic of the corpus processing agent prepares the corpus of the conversation. The corpus processing logic autonomously analyzes the transcription and builds a synonym list of important words in the conversation through the use of a lexical database (block 320). The corpus processing logic then deduces paraphrases of specific topics of the conversation (block 322). Following these two actions, the corpus processing logic autonomously performs word substitution in the corpus of synonyms and paraphrases derived from the lexical database (block 324). The corpus processing logic then builds a popularity index for reoccurring keywords and phrases of the conversation (block 326). The processing logic then creates emotion identifiers in the corpus by qualifying detected emotional patterns exhibited by the speakers at various points in the conversation against known emotional patterns in the conversational database (block 328). The processing logic then updates the link database to correlate common identifiers, paraphrases, topics, and speakers of previously processed conversations with the current conversation (block 330). While the actions performed in block 320, block 322, block 324, block 326, block 328, block 330 are shown sequentially, these actions may be performed concurrently. Finally, the abstract of the conversation is finalized and saved to a storage medium of the corpus processing agent. The process then ends at terminator block 334.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for autonomously creating a corpus of a conversation, the method comprising:
   monitoring a conversation between one or more speakers;
   identifying the spoken languages of the conversation;
   identifying one or more topics being discussed within the conversation;
   in response to identifying the topics being discussed, creating a plurality of metadata tags for each topic of the conversation, wherein the metadata tags include, for each topic of the conversation, one or more of:
      a description of the speakers for a portion of the conversation,
      a description of the languages spoken for a portion of the conversation,
      a summary of the topic of the conversation for a portion of the conversation,
      a plurality of links to other related topics of the conversation, and
      a plurality of links to other related topics of a previously analyzed conversation;
   storing the metadata tags in a link database;
   determining a spoken emotional pattern of an autonomously selected topic of the conversation; and
   creating a corpus of the conversation, wherein the corpus includes a text transcription of the conversation, and also includes an identification of the spoken emotional pattern and metadata tags of the conversation.

2. The method of claim 1, further comprising:
   creating a paraphrase for each topic of the conversation; and
   in response to determining the paraphrase, modifying the corpus to include the paraphrase.

3. The method of claim 2, further comprising:
   referencing a lexical database to create a list of synonyms for words used in a paraphrase; and
   in response to creating the list of synonyms, substituting the synonyms in the corpus.

4. The method of claim 1, further comprising, creating a popularity index of keywords and paraphrases of the conversation.

5. The method of claim 1, further comprising, determining a spoken emotional pattern of a speaker of the conversation for a selected topic of the conversation.

6. The method of claim 5, further comprising:
   in response to determining the spoken emotional pattern, selecting a human emotion associated with the spoken emotional pattern; and
   in response to selecting the human emotion, creating an identifier of the human emotion in the selected topic of the corpus.

7. A corpus processing agent comprising:
   a processor;
   a memory coupled to the processor;
   an audio capture device; and
   a processing logic for:
      monitoring a conversation between one or more speakers;
      identifying the spoken languages of the conversation;
      identifying one or more topics being discussed within the conversation;
      in response to identifying the topics being discussed, creating a plurality of metadata tags for each topic of the conversation, wherein the metadata tags include, for each topic of the conversation, one or more of:
         a description of the speakers for a portion of the conversation,
         a description of the languages spoken for a portion of the conversation,
         a summary of the topic of the conversation for a portion of the conversation,
         a plurality of links to other related topics of the conversation, and
         a plurality of links to other related topics of a previously analyzed conversation;
      storing the metadata tags in a link database;
      determining a spoken emotional pattern of an autonomously selected topic of the conversation; and
      creating a corpus of the conversation, wherein the corpus includes a text transcription of the conversation, and also includes an identification of the spoken emotional pattern and metadata tags of the conversation.

8. The corpus processing agent of claim 7, the processing logic further comprising:
   creating a paraphrase for each topic of the conversation; and
   in response to determining the paraphrase, modifying the corpus to include the paraphrase.

9. The corpus processing agent of claim 8, the processing logic further comprising:
   referencing a lexical database to create a list of synonyms for words used in a paraphrase; and in response to creating the list of synonyms, substituting the synonyms in the corpus.

10. The corpus processing agent of claim 7, the processing logic further comprising, creating a popularity index of keywords and paraphrases of the conversation.

11. The corpus processing agent of claim 7, the processing logic further comprising, determining a spoken emotional pattern of a speaker of the conversation for a selected topic of the conversation.

12. The corpus processing agent of claim 11, the processing logic further comprising:
   in response to determining the spoken emotional pattern, selecting a human emotion associated with the spoken emotional pattern; and
   in response to selecting the human emotion, creating an identifier of the human emotion in the selected topic of the corpus.

13. A computer-readable storage medium, not including transitory signals, having a plurality of instructions embodied therein, wherein the plurality of instructions, when executed by a processing device, causes a machine to:
   monitor a conversation between one or more speakers;
   identify the spoken languages of the conversation;
   identify one or more topics being discussed within the conversation;
   in response to identifying the topics being discussed, create a plurality of metadata tags for each topic of the conversation, wherein the metadata tags include, for each topic of the conversation, one or more of:
      a description of the speakers for a portion of the conversation,
      a description of the languages spoken for a portion of the conversation,
      a summary of the topic of the conversation for a portion of the conversation,
      a plurality of links to other related topics of the conversation, and
      a plurality of links to other related topics of a previously analyzed conversation;
   store the metadata tags in a link database;
   determine a spoken emotional pattern of an autonomously selected topic of the conversation; and
   create a corpus of the conversation, wherein the corpus includes a text transcription of the conversation, and also includes an identification of the spoken emotional pattern and metadata tags of the conversation.

14. The computer-readable storage medium of claim 13, the plurality of instructions further comprising instructions for enabling the machine to:
   create a paraphrase for each topic of the conversation; and
   in response to determining the paraphrase, modify the corpus to include the paraphrase.

15. The computer-readable storage medium of claim 14, the plurality of instructions further comprising instructions for enabling the machine to:
   reference a lexical database to create a list of synonyms for words used in a paraphrase; and
   in response to creating the list of synonyms, substitute the synonyms in the corpus.

16. The computer-readable storage medium of claim 13, the plurality of instructions further comprising instructions for enabling the machine to, create a popularity index of keywords and paraphrases of the conversation.

17. The computer-readable storage medium of claim 13, the plurality of instructions further comprising instructions for enabling the machine to, determine a spoken emotional pattern of a speaker of the conversation for a selected topic of the conversation.

18. The computer-readable storage medium of claim 17, the plurality of instructions further comprising instructions for enabling the machine to:
   in response to determining the spoken emotional pattern, select a human emotion associated with the spoken emotional pattern; and
   in response to selecting the human emotion, create an identifier of the human emotion in the selected topic of the corpus.

* * * * *